(12) United States Patent
Philip et al.

(10) Patent No.: US 9,906,665 B1
(45) Date of Patent: Feb. 27, 2018

(54) DOCUMENT HANDLER HAVING OPPOSING BELTS MAINTAINING CONSTANT SHEET CONTACT FOR SCANNING SMALL AND DELICATE SHEETS

(71) Applicant: Xerox Corporation, Norwalk, CT (US)

(72) Inventors: Prince Bastin Philip, Chennai (IN); Michael John Wilsher, Letchworth (GB); Simon N. Jowett, St Albans (GB); Jeremy Lewis, London (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/420,292

(22) Filed: Jan. 31, 2017

(51) Int. Cl.
  *H04N 1/04* (2006.01)
  *H04N 1/00* (2006.01)
  *G03G 15/00* (2006.01)
  *B65H 5/02* (2006.01)
  *B65H 1/04* (2006.01)
  *B65H 31/00* (2006.01)

(52) U.S. Cl.
  CPC .......... *H04N 1/00588* (2013.01); *B65H 1/04* (2013.01); *B65H 5/023* (2013.01); *B65H 31/00* (2013.01); *G03G 15/602* (2013.01); *G03G 15/605* (2013.01); *H04N 1/0061* (2013.01); *H04N 1/0066* (2013.01); *H04N 1/00602* (2013.01); *H04N 1/00625* (2013.01); *H04N 1/0464* (2013.01); *G03G 2215/00177* (2013.01); *H04N 2201/0081* (2013.01); *H04N 2201/0094* (2013.01)

(58) Field of Classification Search
  CPC ........... B65H 2513/42; B65H 2801/39; B65H 5/021; H04N 1/00877; H04N 1/0312; H04N 1/0318; H04N 1/40006; H04N 1/6027; H04N 2201/02408; H04N 2201/02427; H04N 2201/04755; H04N 5/253
  USPC ....... 358/474, 498, 406, 496, 296, 488, 497, 358/504, 514; 271/225, 10.01, 4.09, 271/10.06, 10.08, 10.09; 399/167, 396, 399/341, 367, 374
  See application file for complete search history.

(56) References Cited

U.S. PATENT DOCUMENTS

| | | |
|---|---|---|
| 3,819,266 A | 6/1974 | Price |
| 4,043,550 A | 8/1977 | Phillips et al. |
| 4,043,665 A | 8/1977 | Caldwell |
| 4,831,419 A | 5/1989 | Iaia, Jr. et al. |
| 4,884,097 A | 11/1989 | Giannetti et al. |
| 4,912,518 A * | 3/1990 | Matsuo .................. G03G 15/60 271/227 |

(Continued)

*Primary Examiner* — Negussie Worku
(74) *Attorney, Agent, or Firm* — Gibb & Riley, LLC

(57) ABSTRACT

Scanning devices include an input tray shaped to hold scannable items before scanning, an output tray shaped to hold the scannable items after scanning, a series of opposing belts positioned to transport the scannable items from the input tray to the output tray, and a round roller contacting a drum belt of the opposing belts. The opposing belts are positioned to have each of the scannable items constantly be held between the opposing belts or between the round roller and the drum belt of the opposing belts while the opposing belts are transporting the scannable items from the input tray to the output tray. A scanner is positioned in a gap between two of the opposing belts, and the gap is in a process direction that the opposing belts are moving the scannable items.

20 Claims, 6 Drawing Sheets

(56) References Cited

U.S. PATENT DOCUMENTS

| | | | | |
|---|---|---|---|---|
| 5,119,213 | A * | 6/1992 | Graves | H04N 1/00681 235/375 |
| 5,358,231 | A * | 10/1994 | Andela | B65H 29/70 271/176 |
| 5,491,557 | A * | 2/1996 | Nakajima | H04N 1/0096 358/296 |
| 5,511,771 | A | 4/1996 | Rubscha | |
| 5,596,399 | A | 1/1997 | Dempsey et al. | |
| 5,847,405 | A | 12/1998 | Acquaviva et al. | |
| 5,946,527 | A | 8/1999 | Salgado et al. | |
| 6,236,471 | B1 * | 5/2001 | Lee | B41J 19/145 358/408 |
| 7,201,369 | B2 | 4/2007 | Blackwell | B65H 9/166 198/407 |
| 7,298,388 | B2 * | 11/2007 | Hsieh | H04N 1/0057 347/218 |
| 8,477,327 | B2 | 7/2013 | Kelly et al. | |
| 8,625,155 | B2 * | 1/2014 | Omata | H04N 1/54 358/1.9 |
| 8,655,253 | B2 * | 2/2014 | Kunii | G03G 15/6585 399/341 |
| 8,711,439 | B2 | 4/2014 | Nacman et al. | |
| 8,893,959 | B1 * | 11/2014 | Graef | B65H 29/12 235/379 |
| 8,987,626 | B2 * | 3/2015 | Allen | B65H 31/06 209/293 |
| 2001/0027669 | A1 * | 10/2001 | Warmack | E05B 63/0004 70/257 |
| 2008/0166153 | A1 * | 7/2008 | Ehara | G03G 15/5008 399/167 |
| 2008/0219543 | A1 * | 9/2008 | Csulits | G07D 7/00 382/135 |
| 2015/0075207 | A1 * | 3/2015 | Karikusa | B65H 29/12 62/380 |

* cited by examiner

DOCUMENT HANDLER HAVING OPPOSING BELTS MAINTAINING CONSTANT SHEET CONTACT FOR SCANNING SMALL AND DELICATE SHEETS

BACKGROUND

Systems and methods herein generally relate to document handlers that move sheets past scanners in order to scan the sheets.

Document handlers are used for quickly and easily processing stacks of sheets through devices such as facsimile machines, copiers, or multi-function printing devices. Some document handler designs include mechanical sheet feeding devices, such as rollers or belts that move sheets from an input tray, past one or more optical scanners, to an output tray. The path along which the sheets move is sometimes called a paper path.

The paper paths within such document handlers include side guides, a feed head that picks up and guides the paper into the paper path, lead edge sensors that register the scan, and can usually handle a very limited number of different paper widths (e.g., 8½ in., A4 width, etc.).

SUMMARY

Exemplary scanning device (such as a document handler connected to a printing device) includes, among other components, an outer cover, and input and output trays connected to the outer cover. The input and output trays are shaped to hold scannable items (e.g., flat items having markings thereon, such as previously printed sheets of print media) before and after scanning. The outer cover also includes a printer connection that is shaped to connect to another device, such as a printing device. Within the outer cover are a series of opposing belts positioned to transport the scannable sheets internally within the scanning apparatus from the input tray to the output tray, and a round roller or drum contacting a "drum" belt.

The opposing belts are positioned to have one surface of one belt (e.g., a first flat surface of a first belt) be parallel to the opposing surface of the opposing belt (e.g., a second flat surface of a second belt). Also, the opposing belts are arranged so that the first flat surface and the second flat surface are positioned relative to each other so that at least one of the scannable sheets is held between the first flat surface and the second flat surface. Thus, the opposing belts can be positioned to contact each other, so as to hold the scannable sheets between the opposing belts. The first flat surface and the second flat surface move together (in the same direction) while the opposing belts are transporting the scannable sheets from the input tray to the output tray.

Thus, the opposing belts are positioned to have each of the scannable sheets constantly held between them (or between the round roller and the roller's belt) from the input tray to the output tray (e.g., the entire time while the opposing belts are transporting the scannable sheets within the document handler). Further, ends of the drum belt are positioned less than the length of the shortest scannable sheet from the other opposing belts. In other words, the items being fed through the document handler are always gripped, pinched, or sandwiched between at least two belts (or between a belt and a roller) from the input tray to the output tray, and the scannable items are not ever allowed to move freely within guides. Therefore, very small, lightweight, and delicate items can be processed through the high-speed document handler because such items are always pinched between two surfaces while they are within the internal portion of the document handler.

This constant pinching does not allow airflow to affect the item being scanned, and prevents drive rollers or roller nips from contacting such items, which eliminates the damage roller nips might otherwise inflict on such scannable sheets, or the paper jams that can occur with very small, lightweight scannable items. Indeed, with the devices described herein, an item being scanned within the document hander only touches belts and a drum roller, and such items do not contact feed rollers, roller nips, or guides.

In one example, a "first" belt and a "third" belt can oppose a "second" belt. A gap (in the process direction that the opposing belts are moving the scannable sheets) exists between the third belt and the first belt, and a scanner is positioned in this gap and is aimed to obtain images in a direction toward the second flat surface of the second belt. The gap is less than the length of the scannable sheets, such that the scannable sheets are constantly held between two of the opposing belts while the opposing belts are transporting the scannable sheets through the gap. Therefore, while the scannable item is passing through the gap, it is held between either the first and second belts or between the third and second belts (or both); yet the gap allows the scanner to obtain an image of the scannable item. More specifically, the scanner obtains an image of the side of the scannable item that is opposite the side of the scannable item that contacts the second belt.

In order to provide duplex scanning (scanning of both sides of an item), a first set of belts can feed the scannable sheets from the input tray to the round drum roller, and a second set of belts can feed the scannable sheets from the round drum roller to the output tray. Further, a first scanner that obtains an image of one side of the scannable item can be positioned within the first set of belts, and a second scanner that obtains an image of the other side of the scannable item can be positioned within the second set of belts. In this exemplary structure, the first set of belts and the second set of belts each include a long belt and two short belts (so named because the long belt is longer than the short belts), and the short belts do not contact each other, but they do contact the long belt. The gap is between the short belts, and leaves a portion of the long belt exposed. The first scanner and the second scanner are positioned in these gaps in each of the first set of belts and the second set of belts, are aimed at the second belts, and obtain images of opposite sides of the item being scanned. The structure feeds the documents around a curved path, allowing input and output trays to be on top of each other; and, hence, reduce the overall size of the document handler.

The opposing belts can all be supported on non-driven rollers and the round roller can be the only element that drives all the opposing belts and the drum belt. In this structure, the opposing belts that do not directly contact the round roller are driven by other opposing belts that contact the round roller, directly or indirectly.

Additionally, a hinge can be connected to a moveable portion of the outer cover. The first belt is connected to the moveable portion to move with the moveable portion of the outer cover. The hinge is positioned to separate the outer cover when the moveable portion is rotated around the hinge. The second flat surface of the second belt is exposed to the exterior of the outer cover when the moveable portion is rotated around the hinge, allowing the scannable sheets to be placed directly from the exterior on the second flat surface. This allows very delicate items to be placed directly on the second belt, and for the document handler to move the scannable item past the scanners. The hinge therefore adds a semi-automatic feeding capability for single items, that are of mixed sizes or are too small to stack in addition to the automatic batch feeder described above; and the hinge further allows a user to continuously manually feed such documents in batches, and is therefore faster than a manual platen scan.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, paper paths within document handlers can usually handle a small number of different paper sizes; however, if the items being scanned are not standard size documents, have mixed sizes (so that they do not align in the side guides), or are very small, a normal roller style paper path will not be able to effectively feed such originals. For example, some document handlers rely upon gravity or momentum to move sheets along low-friction guides (which can result in jams) and use high-speed drive nips (that can damage or jam delicate, light-weight sheets). Therefore, the devices herein provide continuous sheet contact between opposing belts to simultaneously accommodate different sizes pages such as receipts, stamps, checks, etc. With such devices, inner layer and outer layer conveyors hold and inset scanning pages past imaging sensors, and output the scanned pages without causing paper jams or wrinkles.

Figure 1:
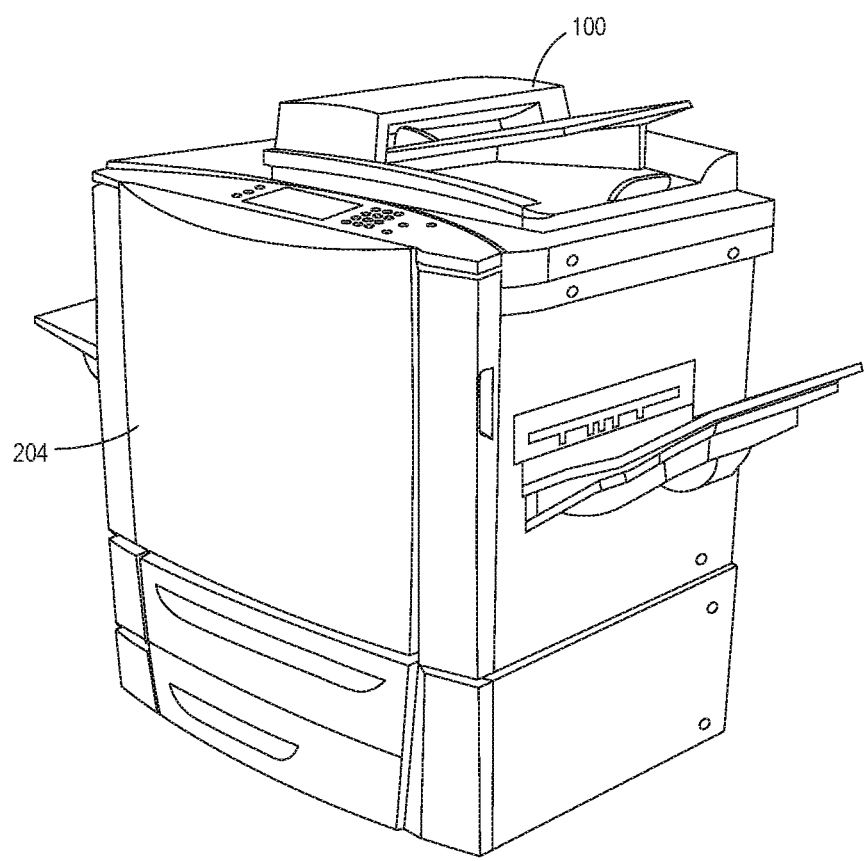
FIG. 1 is a schematic diagram illustrating printing devices herein.

For example, as shown in FIG. 1, a multi-function device (MFD) 204 capable of performing functions such as facsimile, printing, scanning, etc., includes a document handler 100 connected thereto. FIGS. 2-5 illustrate different versions of document handlers 100 in side view.

Figure 2:
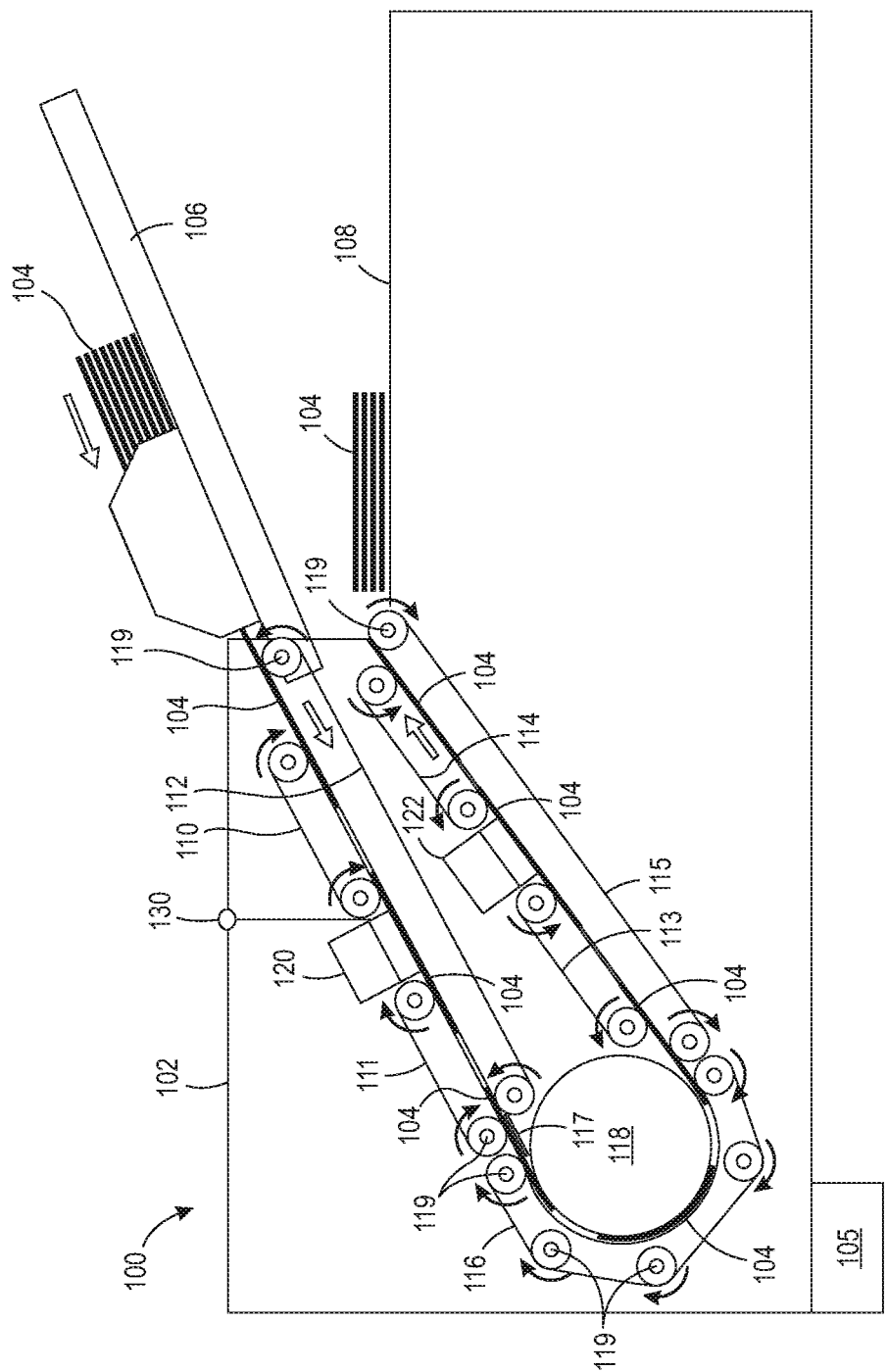
FIG. 2 is a schematic diagram illustrating scanning devices herein.

As shown in FIG. 2, such document handlers/scanning devices 100 can include, among other components, an outer cover 102, and input and output trays 106, 108 connected to the outer cover 102. The input and output trays 106, 108 are shaped to hold scannable items 104 (e.g., flat items having markings thereon, such as previously printed sheets of print media, photographs, newspapers, handwritten notes, etc.) before and after scanning. The outer cover 102 also includes a connection 105 that is shaped to connect to the printing device 204 or other supporting structure.

Within the outer cover 102 are a series of opposing belts 110-112 and 113-115 supported by rollers 119, some of which can be driven, and others of which are not driven (e.g., idler rollers). In some structures herein, all the rollers 119 can be non-driven idler rollers. The opposing belts 110-112 and 113-115 are positioned to transport the scannable sheets 104 internally within the scanning apparatus 100 from the input tray 106, past a first side scanner 120, by a round roller or drum 118 contacting a "drum" belt 116, past a second side scanner 122, and finally to the output tray 108.

Each of the scannable items 104 is generally flat and, therefore, has two planar "sides" (the "sides" are the surfaces that contain markings/images that are scanned) and at least one "edge" where the sides end. For example, a flat square sheet has two sides (front and back sides) and four edges. The first side scanner 120 scans one of the sides of the scannable items 104, the drum 118 inverts the scannable items 104, and the second side scanner 122 scans the other side of the scannable items 104 to provide duplex scanning in a single pass through the document handler 100.

As noted above, the opposing belts 110-112 and 113-115 can all be supported on non-driven rollers 119, and the round roller 118 can be the only element that drives all the opposing belts 110-112 and 113-115 and the drum belt 116. In this structure, the opposing belts that do not directly contact the round roller (e.g., 110, 111, 114) are driven by other opposing belts (e.g., 112, 115, 116) that contact the round roller 118, directly or indirectly. Therefore, since in some structures herein all of the belts contact each other and the drum 118, the whole system can be driven by the drum 118 alone, simplifying the drive system and reducing the number of driven rollers used.

Figure 3:
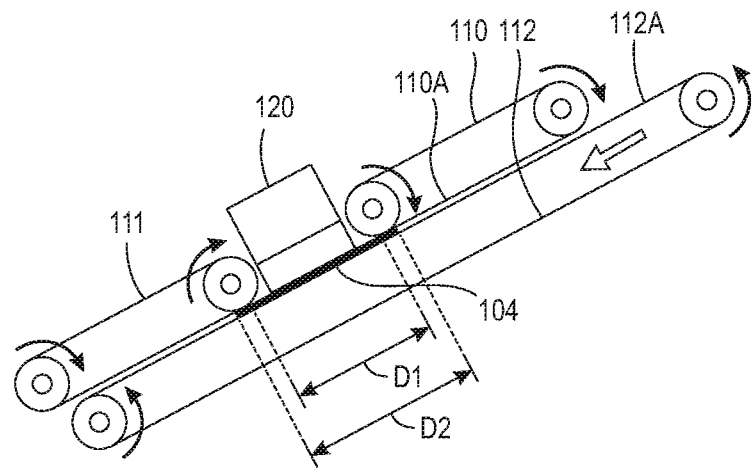
FIGS. 3 and 4 are schematic diagrams illustrating portions of the scanning device shown in FIG. 2.
Figure 4:
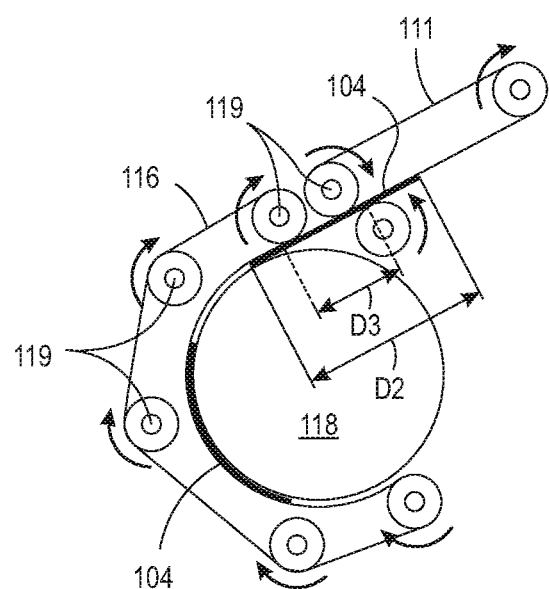
Figure 5:
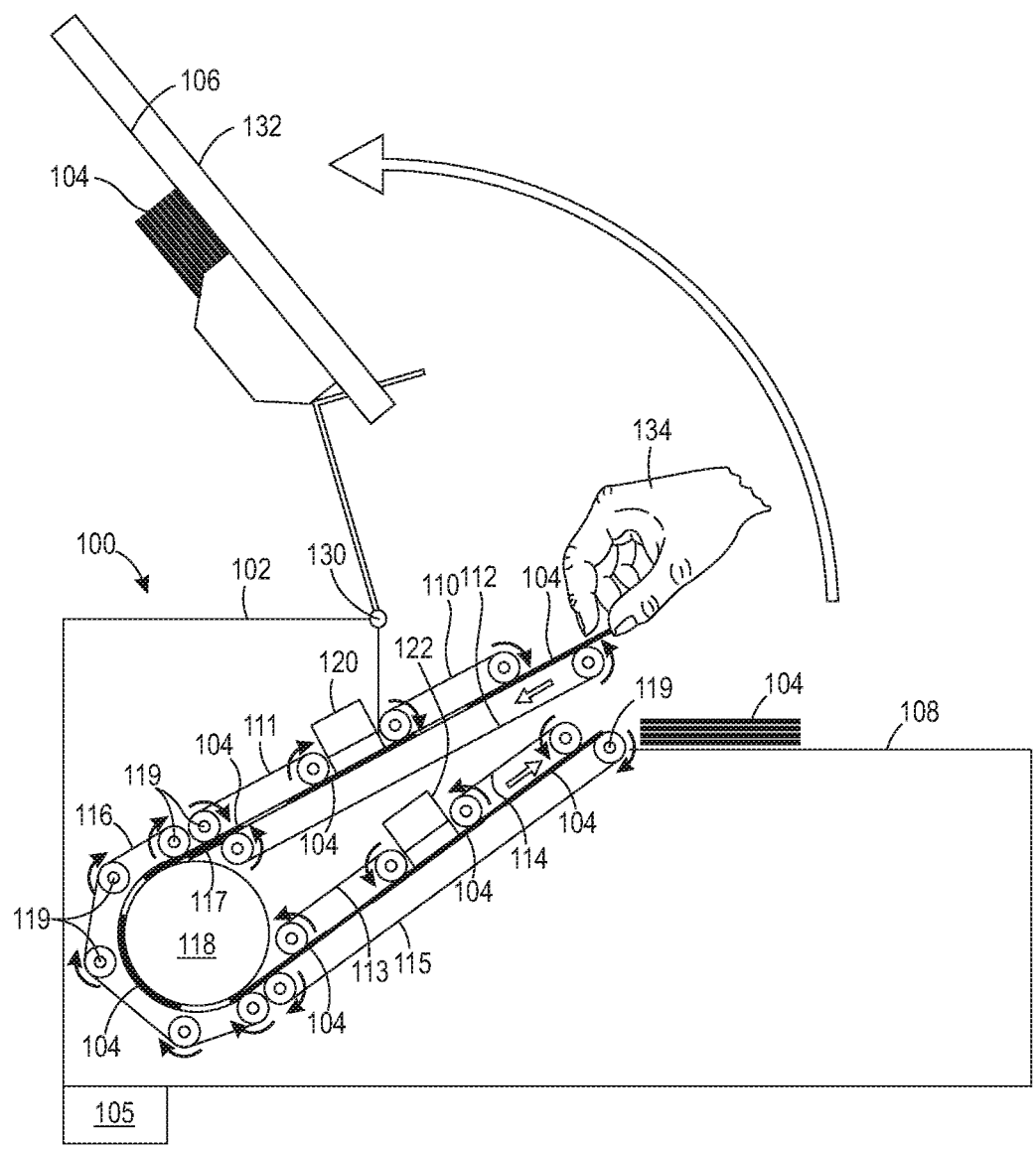
FIGS. 5-6 are schematic diagrams illustrating scanning devices herein.

FIGS. 3 and 4 illustrate portions of the structure shown in FIG. 2. As shown in FIG. 3, the opposing belts 110-112 and 113-115 are positioned to have one surface of one belt (e.g., a first flat surface 110a of a first belt 110) be parallel to the opposing surface of the opposing belt (e.g., a second flat surface 112a of a second belt 112). Also, the opposing belts 110-112 and 113-115 are arranged so that the first flat surface 110a and the second flat surface 112a are positioned relative to each other so that at least one of the scannable sheets 104 is held between the first flat surface 110a and the second flat surface 112a.

Thus, the opposing belts 110-112 and 113-115 can be positioned to contact each other, so as to hold the scannable sheets 104 between the opposing belts 110-112 and 113-115. The first flat surface 110a and the second flat surface 112a move together (in the same direction) as the opposing belts 110-112 and 113-115 move on the rollers 119 while transporting the scannable sheets 104 from the input tray 106 to the output tray 108. In other words, the opposing belts 110-112 and 113-115 are positioned to have each of the scannable sheets 104 constantly held between them (or between the round roller 118 and the roller's belt 116) from the input tray 106 to the output tray 108 (e.g., the entire time while the opposing belts 110-112 and 113-115 are transporting the scannable sheets 104 within the document handler 100).

In one example, shown in FIG. 3, a "first" belt 110 and a "third" belt 111 can oppose a "second" belt 112. A gap D1 (in the process direction that the opposing belts 110-112 and 113-115 are moving the scannable sheets 104) exists between the first belt 110 and the third 111 belt, and the first side scanner 120 is positioned in this gap D1 and is aimed (has the imaging element pointed) to obtain images in a direction toward the second flat surface 112a of the second belt 112. The gap D1 is a linear distance less than the process direction length D2 of the scannable sheets 104, such that the scannable sheets 104 are constantly held between two of the opposing belts 110-112 and 113-115 while the opposing belts 110-112 and 113-115 are transporting the scannable sheets 104 through the gap D1. Therefore, while the scannable item 104 is passing through the gap D1, it is held between either the first and second belts 110, 112 or between the third and second belts 111, 112 (or both); yet the gap D1 allows the first side scanner 120 to obtain an image of the first side of the scannable item 104. More specifically, the first side scanner 120 obtains an image of the first side of the scannable item 104 that is opposite the other (second) side of the scannable item 104 that contacts the second belt 112. This gap D1 determines the smallest documents that can be scanned. For example, the gap D1 can be as small as approximately 50 mm, 25 mm, 10 mm, etc.

As noted above, in order to provide duplex scanning (scanning of both sides of an item), a first set of belts 110-112 can feed the scannable sheets 104 from the input tray 106 to the round drum roller 118, and a second set of belts 113-115 can feed the scannable sheets 104 from the round drum roller 118 to the output tray 108. Further, a first side scanner 120 that obtains an image of the first side of the scannable item 104 can be positioned within the first set of belts 110-112, and a second side 122 scanner that obtains an image of the other side of the scannable item 104 can be positioned within the second set of belts 113-115. As shown in FIG. 2, both scan heads 120, 122 face downward, which is advantageous because it reduces contamination, as gravity will tend to move debris away from the scan heads 120, 122.

Figure 6:
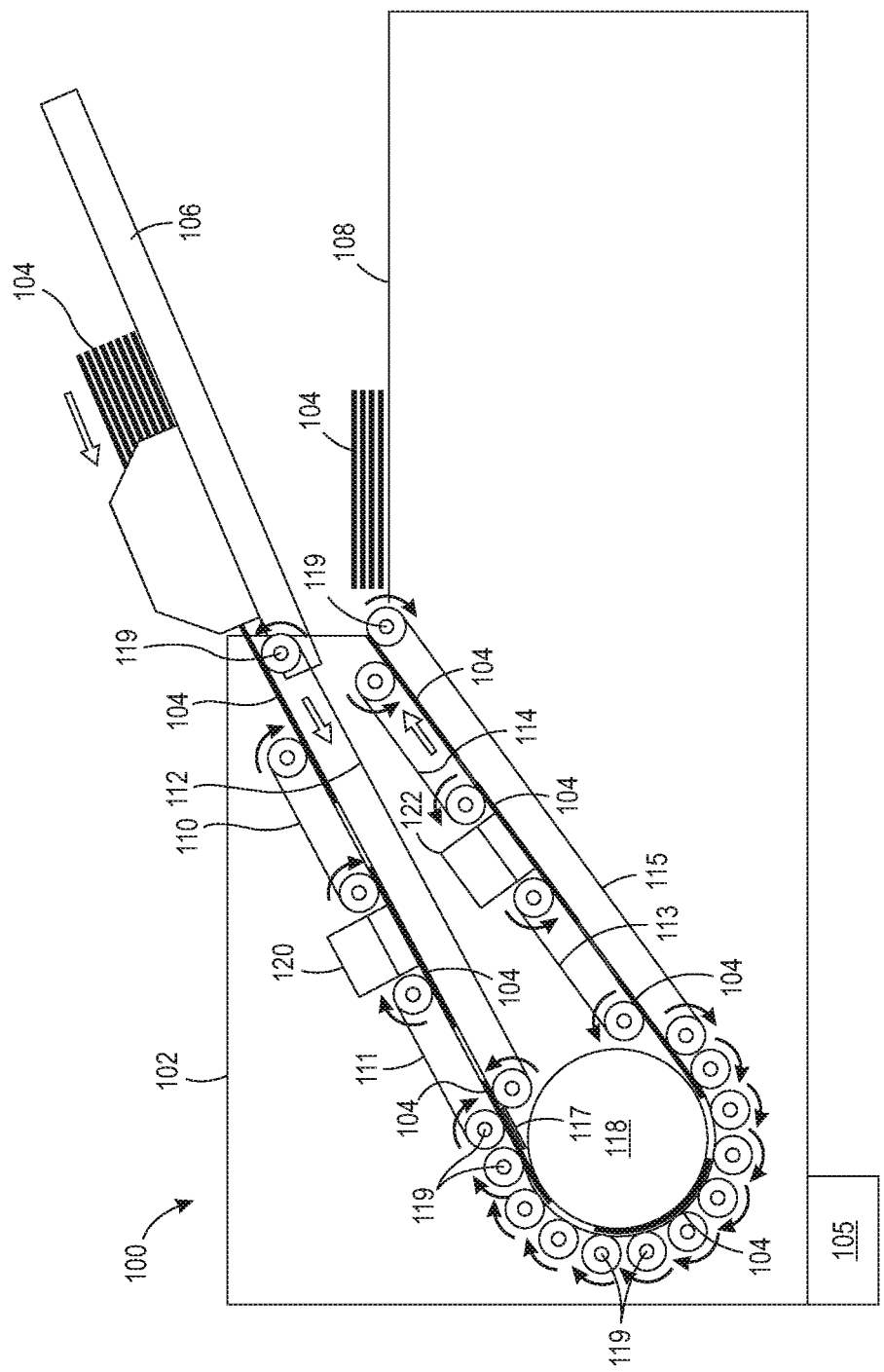

In this exemplary structure, the first set of belts 110-112 and the second set of belts 113-115 each include a long belt 112 and 115 and two short belts 110, 111, and 113 and 114 (so named because the long belt is longer than the short belts), and the short belts 110, 111, and 113 and 114 do not contact each other, but they do contact the long belts 112, 115. In each set of belts, the length of the long belt 112 (or 115) can be approximately equal to (e.g., within 20% of) the lengths of the gap D1 added to the lengths of the short belts 110, 111 (or 113 and 114). Other length belts can also be used. For example, in document handlers 100 that do not include the hinge 130 that is discussed below, the first belt 110 in the series can be made longer (e.g., as shown in FIG. 6, discussed below) so that belt 110 spans the full distance from the scanner 120 to the location where sheets are fed from the input tray 104.

The gap D1 is between the end rollers 119 supporting the short belts 110, 111, and 113 and 114, and leaves a portion of the long belts 112, 115 exposed. In other words, the gap D1 is the distance between the location where one short belt (e.g., 110) is no longer parallel to the opposing belt (e.g., 112) because the belt follows the curved shape of the end roller 119; and the location where the corresponding short belt (e.g., 111) is no longer parallel to the opposing belt (e.g., 112) again because the belt follows the curved shape of the end roller 119. The first side scanner 120 and the second side scanner 122 are positioned in these gaps D1 between the short belts 110, 111, and 113 and 114 in each of the first set of belts 110-112 and the second set of belts 113-115; are aimed at the second belts 112, 115; and obtain images of opposite sides of the item being scanned 104.

Similarly, as shown in FIG. 4, the ends of the drum belt 116 are positioned a distance D3 from the other belts 111, 112, 113, 115 that is less than the length D2 of the shortest scannable sheet. As shown in FIG. 4, this distance D3 is the distance between the locations where the belts 111, 112, 113, 115, 116 are no longer parallel to the scannable item 104. As shown in FIGS. 2 and 4, once the scannable item 104 is pinched between the drum 118 and the belt 116, the drum 118 and the belt 116 move together to constantly hold the scannable item 104 while it is inverted and passed back to the opposing belts 113, 115. In addition, static paper path guides 117 may be included in the document handler 100 at various locations, such as to guide the paper from the exit nip of belts 111-112 to the drum 118 preventing the paper dropping into the gap.

Thus, as shown in FIGS. 2-4, the items 104 being fed through the document handler 100 are always gripped, pinched, or sandwiched between at least two belts (or between a belt and a roller) from the input tray 106 to the output tray 108, and the scannable items 104 are not ever allowed to move freely between roller nips or slide freely within guides based on momentum. Therefore, very small, lightweight, and delicate items can be processed through the high-speed document handler 100, because such items are always pinched between two surfaces while they are moving within the internal portion of the document handler 100.

This constant pinching does not allow airflow to affect the item 104 being scanned, and prevents drive rollers or roller nips from directly contacting such items, which eliminates the damage roller nips might otherwise inflict on such delicate, small scannable sheets 104, and this also prevents the paper jams that can occur with very small, lightweight scannable items 104. Indeed, with the devices described herein, an item 104 being scanned within the document hander 100 only touches belts and a drum roller, and such items do not contact feed rollers, roller nips, or guides.

Additionally, as shown in FIGS. 2 and 5-7, a hinge 130 can be connected to a moveable portion 132 of the outer cover 102. The hinge 130 is positioned to separate the cover 102 when the moveable portion 132 is rotated around the hinge 130. The second flat surface of the second belt 112 is thereby exposed to the exterior of the outer cover 102 when the moveable portion 132 is rotated around the hinge 130, allowing the scannable sheets 104 to be placed directly from the exterior on the second flat surface of the second belt 112 by a user 134. This allows very delicate or varying sized items to be placed directly on the second belt 112, and to be fed into the nip between belts 110 and 112, hence feeding past scan heads 120 and 122. The hinge 130 therefore allows continuous manual feeding of such documents.

FIG. 6 illustrates an alternative structure that is similar to the structures described above; however, in FIG. 6, the drum belt 116 is replaced with multiple rollers 119 that form a series of closely spaced nips along the surface of the drum 118. As with the previously described structures, the gap D3 between any two adjacent nips 119/118 is less than the length (D2) of the shortest scannable item 104 that capable of being processed through the document handler 100.

Therefore as shown above, multiple belts and a roller, with closely spaced gaps account for small document sizes. The spacing D1 between the belts and roller determines the minimum document size D2 that can be processed through the document handler 100. Further, while the foregoing structures are discussed with very small and lightweight scannable items, standard sized items (8.5×11 paper, A4 paper, legal paper, etc.) can also be easily processed through such document handlers 100.

With the above devices, conventional image processing can detect the outline of documents on the belt, crop the belt out and also orient and correlate side 1 and 2 scans to produce a single double sided document scan. Since the images are detected by the image path, cropped and registered individually for side 1 and side 2 using conventional processing, the position of the scan heads is not critical. Normally, the two heads are close together, minimizing registration difference. Further, the combination of belts and rollers minimizes motion defects and velocity differentials. Typically, the belt color is chosen to contrast with typical documents, aiding document detection against the belt.

Figure 7:
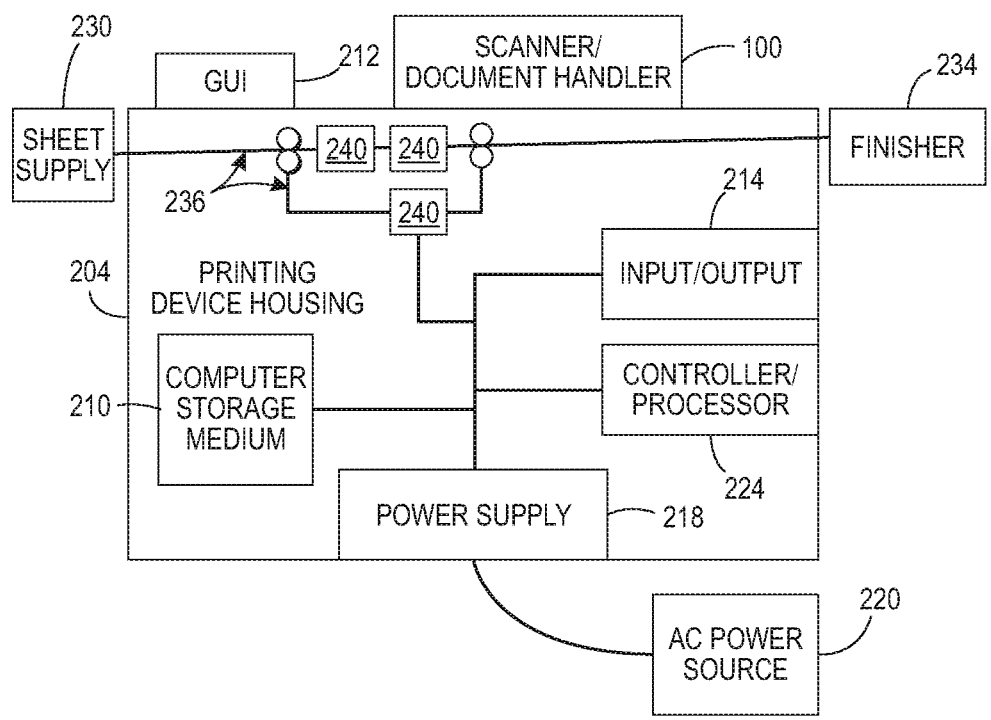
FIG. 7 is a schematic diagram illustrating printing devices herein.

FIG. 7 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 7, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 that use marking material, and are operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as the scanner/document handler 100 (automatic document feeder (ADF)), etc., discussed above) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A scanning apparatus comprising:
   an input tray shaped to hold scannable items before scanning;
   an output tray shaped to hold scannable items after scanning;
   opposing belts positioned to transport said scannable items from said input tray to said output tray;
   a round roller contacting a drum belt of said opposing belts, said opposing belts are positioned to have each of said scannable items constantly be held between said opposing belts or between said round roller and said drum belt of said opposing belts while said opposing belts are transporting said scannable items from said input tray to said output tray; and
   a scanner positioned in a gap between two of said opposing belts,
   said gap is in a process direction that said opposing belts are moving said scannable items, and
   said opposing belts include a first set of belts feeding said scannable items from said input tray to said round roller, and a second set of belts feeding said scannable items from said round roller to said output tray.

2. The scanning apparatus according to claim 1, said opposing belts are positioned to contact each other to hold said scannable items between said opposing belts.

3. The scanning apparatus according to claim 1, said gap is less than the length of said scannable items, such that said scannable items are constantly held between two of said opposing belts while said opposing belts are transporting said scannable items through said gap.

4. The scanning apparatus according to claim 1,
   said scanner comprises a first scanner positioned within said first set of belts and a second scanner positioned within said second set of belts.

5. The scanning apparatus according to claim 4, said first set of belts and said second set of belts each include a long belt and two short belts,
   said long belt is longer than said short belts,
   said short belts contact said long belt,
   said gap is between said short belts, and
   said first scanner and said second scanner are positioned in said gap in each of said first set of belts and said second set of belts.

6. The scanning apparatus according to claim 1, ends of said drum belt of said opposing belts are positioned less than the length of said scannable items from other belts of said opposing belts.

7. The scanning apparatus according to claim 1, said opposing belts are supported on non-driven rollers, said round roller drives all said opposing belts and said drum belt, and ones of said opposing belts that do not directly contact said round roller are driven by other opposing belts that contact said round roller, directly or indirectly.

8. A document handler comprising:
   an input tray shaped to hold scannable sheets before scanning;
   an output tray shaped to hold said scannable sheets after scanning;
   a series of opposing belts positioned to transport said scannable sheets internally within said document handler from said input tray to said output tray, said opposing belts are positioned to have a first flat surface of a first belt be parallel to a second flat surface of a second belt and to have said first flat surface and said second flat surface be positioned relative to each other to have one of said scannable sheets held between said first flat surface and said second flat surface, and said first flat surface and said second flat surface move together in the same direction while said opposing belts are transporting said scannable sheets from said input tray to said output tray;
   a round drum contacting a drum belt of said opposing belts, said opposing belts are positioned to have each of said scannable sheets constantly held between said opposing belts or between said round drum and said drum belt of said opposing belts while said opposing belts are transporting said scannable sheets from said input tray to said output tray, said opposing belts include a third belt, said first belt and said third belt oppose said second belt, a gap exists between said third belt and said first belt, and said gap is in a process direction that said opposing belts are moving said scannable sheets; and
   at least one scanner positioned in said gap, said scanner is positioned in said gap to obtain images in a direction toward said second flat surface of said second belt.

9. The document handler according to claim 8, said opposing belts are positioned to contact each other to hold said scannable sheets between said opposing belts.

10. The document handler according to claim 8, said gap is less than the length of said scannable sheets, such that said scannable sheets are constantly held between two of said opposing belts while said opposing belts are transporting said scannable sheets through said gap.

11. The document handler according to claim 8, said opposing belts include a first set of belts feeding said scannable sheets from said input tray to said round drum, and a second set of belts feeding said scannable sheets from said round drum to said output tray, said scanner comprises a first scanner positioned within said first set of belts and a second scanner positioned within said second set of belts.

12. The document handler according to claim 11, said first set of belts and said second set of belts each include a long belt and two short belts,
   said long belt is longer than said short belts,
   said short belts contact said long belt,
   said gap is between said short belts, and
   said first scanner and said second scanner are positioned in said gap in each of said first set of belts and said second set of belts.

13. The document handler according to claim 8, ends of said drum belt of said opposing belts are positioned less than the length of said scannable sheets from other belts of said opposing belts.

14. The document handler according to claim 8, said opposing belts are supported on non-driven rollers, said round drum drives all said opposing belts and said drum belt, and ones of said opposing belts that do not directly contact said round drum are driven by other opposing belts that contact said round roller, directly or indirectly.

15. A document handler comprising:
- an outer cover;
- an input tray connected to said outer cover, said input tray is shaped to hold scannable sheets before scanning;
- an output tray connected to said outer cover, said output tray is shaped to hold said scannable sheets after scanning;
- a series of opposing belts positioned to transport said scannable sheets internally within said scanning apparatus from said input tray to said output tray, said opposing belts are positioned to have a first flat surface of a first belt be parallel to a second flat surface of a second belt and to have said first flat surface and said second flat surface be positioned relative to each other to have one of said scannable sheets held between said first flat surface and said second flat surface, and said first flat surface and said second flat surface move together in the same direction while said opposing belts are transporting said scannable sheets from said input tray to said output tray;
- a round drum contacting a drum belt of said opposing belts, said opposing belts are positioned to have each of said scannable sheets constantly held between said opposing belts or between said round drum and said drum belt of said opposing belts while said opposing belts are transporting said scannable sheets from said input tray to said output tray, said opposing belts include a third belt, said first belt and said third belt oppose said second belt, a gap exists between said third belt and said first belt, and said gap is in a process direction that said opposing belts are moving said scannable sheets;
- at least one scanner positioned in said gap, said scanner is positioned in said gap to obtain images in a direction toward said second flat surface of said second belt; and
- a hinge connected to a moveable portion of said outer cover,
- said first belt is connected to said moveable portion to move with said moveable portion,
- said hinge is positioned to separate said outer cover when said moveable portion is rotated around said hinge, and
- said second flat surface of said second belt is exposed to the exterior of said outer cover when said moveable portion is rotated around said hinge, allowing said scannable sheets to be placed directly from said exterior on said second flat surface.

16. The document handler according to claim 15, said opposing belts are positioned to contact each other to hold said scannable sheets between said opposing belts.

17. The document handler according to claim 15, said gap is less than the length of said scannable sheets, such that said scannable sheets are constantly held between two of said opposing belts while said opposing belts are transporting said scannable sheets through said gap.

18. The document handler according to claim 15, said opposing belts include a first set of belts feeding said scannable sheets from said input tray to said round drum, and a second set of belts feeding said scannable sheets from said round drum to said output tray,
- said scanner comprises a first scanner positioned within said first set of belts and a second scanner positioned within said second set of belts.

19. The document handler according to claim 18, said first set of belts and said second set of belts each include a long belt and two short belts,
- said long belt is longer than said short belts,
- said short belts contact said long belt,
- said gap is between said short belts, and
- said first scanner and said second scanner are positioned in said gap in each of said first set of belts and said second set of belts.

20. The document handler according to claim 15, said opposing belts are supported on non-driven rollers, said round drum drives all said opposing belts and said drum belt, and ones of said opposing belts that do not directly contact said round drum are driven by other opposing belts that contact said round roller, directly or indirectly.

* * * * *